No. 790,154. Patented May 16, 1905.

UNITED STATES PATENT OFFICE.

GIUSEPPE REALE, OF LAURIA, ITALY.

PROCESS OF FORMING SOAP FROM HYDROCARBON.

SPECIFICATION forming part of Letters Patent No. 790,154, dated May 16, 1905.

Application filed June 2, 1902. Serial No. 109,985.

*To all whom it may concern:*

Be it known that I, GIUSEPPE REALE, a subject of the King of Italy, and a resident of Lauria, Italy, have invented certain new and useful Improvements in Processes of Forming Soap from Hydrocarbons, (for which I have applied for Letters Patent in the Kingdom of Italy on March 28, 1902,) of which the following is a specification.

The object of the present invention is the incorporation of petroleum hydrocarbons in soap, &c.

According to this process petroleum hydrocarbons, vaseline, oils, &c., are heated, with a desirable percentage, such as fifteen per cent., of cetin or of spermaceti and a highly-concentrated alkaline lye of 20° to 36° Baumé, up to 105° to 115° centigrade.

The operation is performed as follows: In a tank or boiler containing the petroleum hydrocarbons are introduced the spermaceti and the alkaline solution at 15° Baumé, which must be present in such a quantity as is necessary to have a quantity of alkali corresponding to half the quantity of spermaceti employed. As soon as boiling begins an energetic reaction is observed, with rapid effervescence, which gradually decreases, the temperature remaining constant. It will then be seen that the petroleum hydrocarbons are intimately emulsified with the lye. The concentration of the alkaline solution containing the petroleum hydrocarbons in emulsion is continued by a slow heat, and from time to time fresh lye at 20° Baumé concentration is added gradually as the water evaporates. This operation is continued at slow heat, always adding fresh lye of the said degree of concentration until the emulsified composition is so consistent that it bubbles with difficulty, sputtering boiling soap drops. Then a certain quantity of lye must be added containing a larger quantity of sodium chlorid or salt than is contained in fresh lye, or I may add the quantity of sodium chlorid corresponding to twelve to sixteen per cent. of the hydrocarbons employed. This is done to separate the lye from the soap, continuing the boiling in order to further concentrate the lye and render it more powerful. When the paste has reached the desired density, it is taken away from the heat and left to cool in order to separate the lyes, which accumulate at the bottom of the vessel. When this operation has been accomplished, the vessel is put again on the heat, which is always kept slow, and the mass is treated with unused lye at 13° Baumé. As soon as the boiling begins an abundant quantity of foam is produced and the soap becomes granulous. The paste, as the concentration is progressing, gradually dries, and if the operation is carried out regularly the foam soon disappears, whereupon the vessel is taken away from the heat and left to cool in order to separate the lye. The latter is kept to serve for subsequent use. The boiled soap is in the form of a granular incoherent mass containing much alkali. The soap must then be rendered glutinous and tenacious, and the excess of alkali must be separated. This is accomplished in the following manner: The granular mass is dissolved in a small quantity of soft water to which one-twentieth of the preceding lye, treated with lime to purify and render it more caustic, is added, so that the saponaceous mass floats. The grains become flat and purified from the alkali, and when they have assumed the said flat appearance a small quantity of twice-boiled lye is added which has the density of 12° Baumé and has been clarified with lime. The mass is then again put on the heat and heated moderately till the condensed paste floats. Then the mass is again taken away from the heat, and the lyes are decanted. Thereupon other twice-boiled clear white caustic lyes at 6° Baumé are poured on the paste, together with sea-salt, so as to have a density of 8°, and the slow boiling is continued until the paste barely floats and the particles are elongated, bright, and almost transparent and are detachable from the finger as a thin, consistent, and not very alkaline film. Thereupon the heat is lessened, and after a short evaporation it is totally removed, and the boiler or vessel is accurately covered, so that purification may take place spontaneously. After fifteen to twenty hours the saponaceous mass will be found divided into three layers, the intermediate of which will be the pure one. The top layer is taken off and barreled. Then the second one is taken off with a large spoon until the third impure layer has been reached, which is distant from eight to ten centimeters from the lye. When the paste has the desired density, it is melted and poured into wooden molds and there cooled. Then it is divided into a number of small portions to be submitted to stamping or compression in dies or preferred patterns. From the soap so formed by acidulation, &c., bodies can be separated which may be used as substitutes for fats in various relations.

Having described my invention, what I claim is—

A process for forming soap from hydrocarbon and the products of the latter which consists in heating the hydrocarbon or said products to 105° to 115° centigrade, with fifteen per cent. cetin or spermaceti, and a highly-concentrated alkaline lye of 20° to 36° Baumé and then separating the soap formed.

In witness whereof I have hereunto set my signature in the presence of two witnesses.

GIUSEPPE REALE.

Witnesses:
S. W. ZEMENDI,
A. RAZZI.